United States Patent
Saito et al.

(10) Patent No.: US 10,444,655 B2
(45) Date of Patent: Oct. 15, 2019

(54) CHARGING ROLL FOR ELECTROPHOTOGRAPHIC EQUIPMENT

(71) Applicant: Sumitomo Riko Company Limited, Aichi (JP)

(72) Inventors: Yoshihiro Saito, Aichi (JP); Yasuhide Watanabe, Aichi (JP); Shigeki Kanda, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/383,677

(22) Filed: Apr. 15, 2019

(65) Prior Publication Data

US 2019/0235409 A1    Aug. 1, 2019

Related U.S. Application Data

(63) Continuation of application No. PCT/JP2018/005668, filed on Feb. 19, 2018.

(30) Foreign Application Priority Data

Feb. 22, 2017 (JP) ................... 2017-030595

(51) Int. Cl.
*G03G 15/02* (2006.01)
*H01B 1/20* (2006.01)
(Continued)

(52) U.S. Cl.
CPC ......... *G03G 15/0233* (2013.01); *F16C 13/00* (2013.01); *G03G 15/0808* (2013.01); *H01B 1/20* (2013.01)

(58) Field of Classification Search
CPC ........... G03G 15/0233; G03G 15/0808; G03G 15/1685; G03G 2215/00683; F16C 13/00; H01B 1/20
See application file for complete search history.

(56) References Cited

U.S. PATENT DOCUMENTS 5,162,183 A * 11/1992 Lindblad ............. G03G 5/0525
427/74
2003/0082470 A1* 5/2003 Asano .................. G03G 5/142
430/60
(Continued)

FOREIGN PATENT DOCUMENTS

JP   2002214879     7/2002
JP   2008096870 A * 4/2008
JP   2015090454     5/2015

OTHER PUBLICATIONS

"International Search Report (Form PCT/ISA/210) of PCT/JP2018/005668," dated Apr. 3, 2018, with English translation thereof, pp. 1-5.

*Primary Examiner* — David M. Gray
*Assistant Examiner* — Laura Roth
(74) *Attorney, Agent, or Firm* — JCIPRNET

(57) ABSTRACT

The disclosure provides a charging roll for excellent image quality electrophotographic equipment. This charging roll for electrophotographic equipment is provided with a shaft body, an elastic body layer formed on the outer periphery of the shaft body, and a surface layer formed on the outer periphery of the elastic body layer, wherein the surface layer contains a modifier having polyamide and a hydroxyl group, and has a Bénard cell with a height of 0.1 to 1.0 μm on the surface thereof. A fluorine-based modifier having a hydroxyl group, a silicone-based modifier having a hydroxyl group, and an acrylic modifier having a hydroxyl group can be cited as examples of the modifier having the hydroxyl group.

1 Claim, 4 Drawing Sheets

(51) Int. Cl.
    *G03G 15/08*     (2006.01)
    *F16C 13/00*     (2006.01)

(56) References Cited

U.S. PATENT DOCUMENTS

2009/0015927 A1*   1/2009   Matsumura ............ G02B 1/105
                                                                                                   359/614
2015/0125183 A1     5/2015   Rokutan et al.

* cited by examiner

CHARGING ROLL FOR ELECTROPHOTOGRAPHIC EQUIPMENT

CROSS-REFERENCE TO RELATED APPLICATIONS

This application is a continuation application of International Application number PCT/JP2018/005668, filed on Feb. 19, 2018, which claims the priority benefit of Japan Patent Application No. 2017-030595, filed on Feb. 22, 2017. The entirety of each of the above-mentioned patent applications is hereby incorporated by reference herein and made a part of this specification.

BACKGROUND

Technical Field

The disclosure relates to a charging roll for electrophotographic equipment and a method for manufacturing a charging roll for electrophotographic equipment, and the charging roll for electrophotographic equipment is suitably used in electrophotographic equipment such as a copier, a printer, and a facsimile, which employ an electrophotographic method.

Description of Related Art

As a charging member of electrophotographic equipment, a charging member that has a base layer having rubber elasticity on an outer periphery of a core bar and has a surface layer on an outer periphery of the base layer is known. In addition, in the charging member, roughness-forming particles may be added to a binder resin of a surface layer in some cases for charging characteristics and the like, for example. Furthermore, Japanese Patent Application Laid-Open No. 2015-90454 (JP-A No. 2015-90454) discloses that porous resin particles and a silicone oil are combined with a binder resin in a surface layer. Furthermore, Japanese Patent Application Laid-Open No. 2002-214879 (JP-A No. 2002-214879) discloses that a silicone oil having a reactive functional group is added to a fluorine resin having active hydrogen in a coating film layer.

In JP-A No. 2015-90454, by combining the porous resin particles and the silicone oil with the binder resin, Bénard cells are not generated on an outer periphery surface of a surface layer. This inhibits uneven distribution of the porous resin particles at boundary portions of cells during a process of generating the Bénard cells. In addition, in JP-A No. 2002-214879, bleeding of the silicone oil is inhibited by fixing the silicone oil to the fluorine resin in the coating film layer through a reaction.

SUMMARY

As a result of intensive investigation by the inventors of the disclosure, the viewpoint that a condition in which a moderate amount of Bénard cells are present on the surface of the surface layer of the charging roll improves image quality, has been obtained. Accordingly, the inventors of the disclosure completed the disclosure.

The disclosure provides a charging roll for electrophotographic equipment allowing excellent image quality, and a method for manufacturing a charging roll for electrophotographic equipment.

A charging roll for electrophotographic equipment according to the disclosure includes an elastic body layer; and a surface layer formed on an outer periphery of the elastic body layer, in which the surface layer contains polyamide and a modifier having a hydroxyl group, the modifier having a hydroxyl group is at least one kind of a fluorine-based modifier, a silicone-based modifier, or an acrylic modifier, and the surface layer has Bénard cells with a height of 0.1 to 1.0 μm on a surface thereof.

In an embodiment of the disclosure, the modifier having a hydroxyl group is the fluorine-based modifier. In an embodiment of the disclosure, the surface layer contain roughness-forming particles having an average particle diameter is within a range of 3.0 to 30 μm. In an embodiment of the disclosure, a size of the Bénard cells is within a range of 250 to 1100 μm.

A method for manufacturing a charging roll for electrophotographic equipment according to the disclosure is a method for manufacturing the above-described charging roll for electrophotographic equipment according to the disclosure, the method including coating the outer periphery of the elastic body layer with a coating liquid that contains the polyimide and the modifier having a hydroxyl group as solutes and contains a mixed solvent of toluene and methanol as a solvent; and then drying the liquid at a temperature of 100 to 150° C. for 30 to 60 minutes so as to form the surface layer.

DESCRIPTION OF THE EMBODIMENTS

Hereinafter, the disclosure will be described in detail. A shape of a charging member for electrophotographic equipment according to the disclosure is not particularly limited as long as a member to be charged such as a photosensitive drum can be charged thereby. For example, a charging member having a shape such as a roll, plate, and block shape can be applied. A particularly preferable charging member is a charging member having a roll shape. Hereinafter, the charging member having a roll shape will be explained with examples.

Figure 1A:
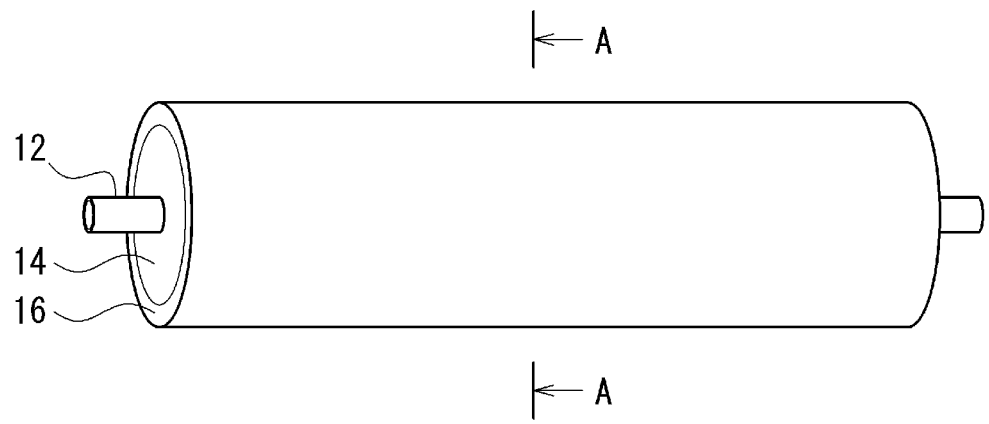
FIG. 1(a) shows a schematic external view of a charging roll for electrophotographic equipment according to one embodiment of the disclosure.
Figure 1B:
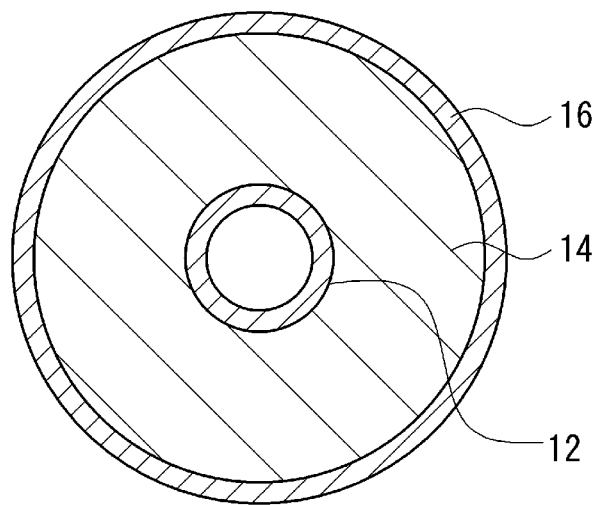
FIG. 1(b) is a cross-sectional view taken along the line A-A of FIG. 1(a).
Figure 2A:
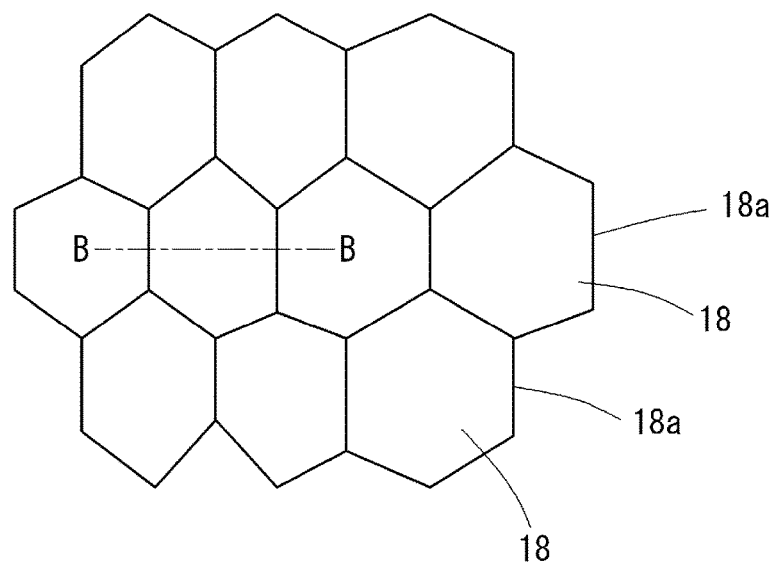
FIG. 2(a) shows a surface enlarged view and FIG. 2(b) is a cross-sectional view taken along the line B-B of FIG. 2(a), which schematically show a surface structure of a surface layer of the charging roll for electrophotographic equipment shown in FIGS. 1(a) and 1(b).
Figure 2B:
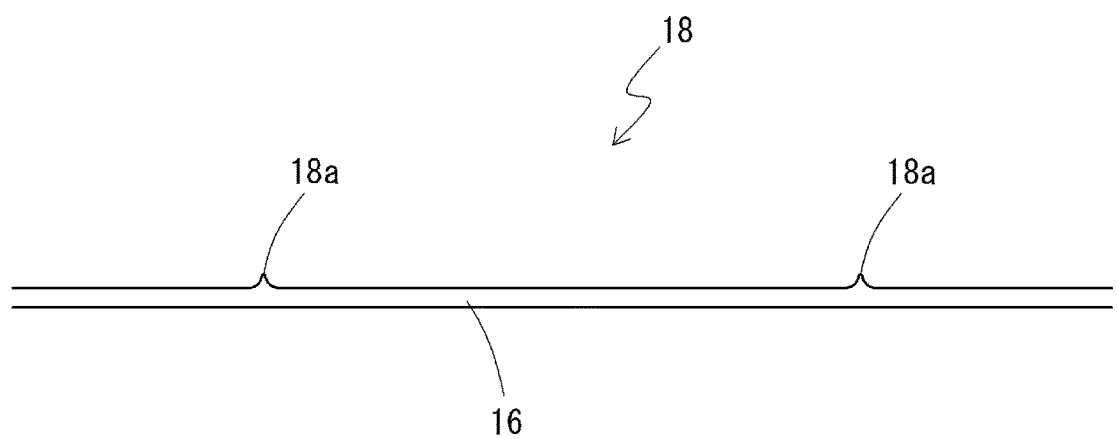

A charging roll for electrophotographic equipment according to the disclosure (hereinafter simply referred to as the charging roll) will be described in detail. FIG. 1(a) shows a schematic external view of the charging roll for electrophotographic equipment according to one embodiment of the disclosure, and FIG. 1(b) is a cross-sectional view taken along the line A-A of FIG. 1(a). FIG. 2(a) shows a surface enlarged view and FIG. 2(b) is a cross-sectional view taken along the line B-B of FIG. 2(a), which schematically show a surface structure of a surface layer of the charging roll shown in FIGS. 1(a) and 1(b).

A charging roll 10 includes a shaft body 12, an elastic body layer 14 formed on an outer periphery of the shaft body 12, and a surface layer 16 formed on the outer periphery of the elastic body layer 14. The elastic body layer 14 is a layer serving as a base of the charging roll 10. The surface layer 16 is a layer appearing on a surface of the charging roll 10.

The surface layer 16 contains polyamide and a modifier having a hydroxyl group, and has Bénard cells with a height of 0.1 to 1.0 μm on a surface thereof. The Bénard cells 18 are cells generated by a phenomenon in which a vortex flow occurs inside a coating film due to heating and the like, and a hexagonal cell structure mainly appears as a result when forming the surface layer 16. The vortex flow occurs in a vertical direction inside the coating film, and occurs from a center to the outside on a surface of the coating film. The Bénard cells 18 refer to a region surrounded by a cell wall 18a.

The polyamide is a binder polymer of the surface layer 16 and is a base polymer. The surface layer 16 may contain a polymer other than a polyamide as the binder polymer as long as the scope of the disclosure is not affected thereby, but the binder polymer may be composed of only polyamide. The polyamide is a polymer having a relatively large surface free energy. For this reason, in a coating film containing polyamide, a Bénard cell phenomenon is likely to occur during a drying process of the film. In other polymers, the Bénard cell phenomenon is unlikely to occur. The disclosure actively attempts to create the Bénard cells 18 on the surface of the surface layer 16 by utilizing properties of such a coating film containing polyamide.

The type of polyamide is not particularly limited. Examples of the polyamide include nylon containing an aliphatic skeleton and aramid composed of only an aromatic skeleton. Examples of the nylon include n-nylon synthesized by a polycondensation reaction of w-amino acid; and n,m-nylon synthesized by a co-polycondensation reaction of a diamine and a dicarboxylic acid. Examples of n-nylon include nylon 6, nylon 11, nylon 12, and the like. Examples of n,m-nylon include nylon 66 and the like. The polyamide may be denatured or non-denatured. Examples of a denatured group include an N-methoxymethyl group, a silicone group, a fluorine group, and the like. Among these, N-methoxymethylated nylon is preferable from the viewpoint of a high level of a dielectric property (electrostatic property) and the like.

The modifier having a hydroxyl group adjusts a surface tension of the coating film containing polyamide to adjust a height of the Bénard cells 18. The reason for this is presumed to be that a hydroxyl group of the modifier intermolecularly interacts with the polyamide via a hydrogen bond. With a modifier not having a functional group or a modifier having other functional groups and having no hydroxyl groups, the Bénard cell phenomenon is inhibited even in a coating film containing polyamide, and thus the Bénard cells 18 are not formed. A modifier not having a functional group cannot intermolecularly interact with polyamide via a hydrogen bond. The reason for this is presumed to be that, in other functional groups (for example, a carboxylic acid group and the like), an intramolecular hydrogen bond takes priority, and therefore intermolecular interaction with polyamide occurs less. The modifier having a hydroxyl group is required to form the Bénard cells 18 on the surface of the surface layer 16.

The modifier having a hydroxyl group may be a solid or a liquid at room temperature as long as the modifier can be dissolved and dispersed in the coating film containing polyamide. From the viewpoints of better solubility and dispersibility, the modifier having a hydroxyl group is more preferably a liquid at room temperature. Examples of the modifier having a hydroxyl group include a fluorine-based modifier, a silicone-based modifier, an acrylic modifier, and the like. For the modifier having a hydroxyl group, only one kind thereof may be used alone, or two or more of kinds thereof may be used in combination. Among these, the fluorine-based modifier is more preferable. With the fluorine-based modifier, an effect of inhibiting tackiness of the surface of the surface layer 16 becomes better, and adhesion of residual toner and toner external additives is more likely to be inhibited. In addition, even if residual toner and toner external additives adhere, the residual toner and toner external additives can be easily removed. Examples of the fluorine-based modifier include a fluorine surfactant and the like. Examples of the fluorine-based modifier include the MEGAFACE series manufactured by DIC Corporation, and the like. Examples of the silicone-based modifier include a silicone oil and the like. Examples of the acrylic modifier include an acrylic polymer, a silicone-acrylic polymer, and the like. The acrylic polymer is an acrylic homopolymer or an acrylic copolymer composed of at least one of an acrylate ester or a methacrylate ester. The silicone-acrylic polymer is a silicone-modified acrylic polymer.

In the surface layer 16, a content of the modifier having a hydroxyl group is preferably 0.1 parts by mass or more with respect to 100 parts by mass of the polyamide from the viewpoint of excellence in the effect of forming the Bénard cells 18 on the surface of the surface layer 16, and the like. The content is more preferably 0.3 parts by mass or more, and even more preferably 0.5 parts by mass or more. The content is preferably 3.0 parts by mass or less from the viewpoint of inhibiting aggregation of the modifier such that excellent dispersibility is exhibited. The content is more preferably 2.0 parts by mass or less, and even more preferably 1.0 parts by mass or less.

The Bénard cells 18 are distributed on the surface of the surface layer 16, thereby preventing contaminants from being locally concentrated. Due to the contaminants adhering to the cell wall 18a of the Bénard cells 18, the contaminants are prevented from being locally concentrated in the vicinity and the like of roughness-forming particles. The contaminants are residual toner, external additives, and the like. When contaminants are not locally concentrated, the image quality improves. The height of the Bénard cells 18 is 0.1 μm or more. When the height is less than 0.1 μm, the contaminants do not adhere to the cell walls 18a of the Bénard cells 18, and therefore the contaminants cannot be prevented from being locally concentrated. In addition, from this viewpoint, the height is more preferably 0.2 μm or more, and even more preferably 0.3 μm or more. Meanwhile, the height of the Bénard cells 18 is 1.0 jam or less. The Bénard cells 18 with a height of more than 1.0 μm greatly affect the surface roughness, thereby deteriorating the image quality. In addition, from this viewpoint, the height is more preferably 0.8 μm or less, and even more preferably 0.7 μm or less. The height of the Bénard cells 18 is measured by observing the surface of the surface layer 16 with a laser microscope. A height from the location at a maximum depth in the Bénard cells 18 to an apex of the cell wall 18a is measured and represented by an average of an arbitrary 20 Bénard cells 18.

The size of the Bénard cells 18 is preferably 250 μm or more from the viewpoint of uniformity of electrostatic charge and the like. The size is more preferably 300 μm or more. In addition, from the viewpoints of uniform dispersibility, prevention of local contaminants, and the like, the size is preferably 1100 μm or less. The size is more preferably 1000 μm or less. The size of the Bénard cells 18 is measured by observing the surface of the surface layer 16 with a laser microscope. A longest distance from the apex of the cell wall 18a to a diagonal point thereof is measured and represented by an average of an arbitrary 20 Bénard cells 18.

The surface layer 16 may contain roughness-forming particles for forming roughness of the surface layer 16. When the surface layer 16 contains roughness-forming particles, it is possible to further improve the charging characteristics of the charging roll 10.

Figure 3A:
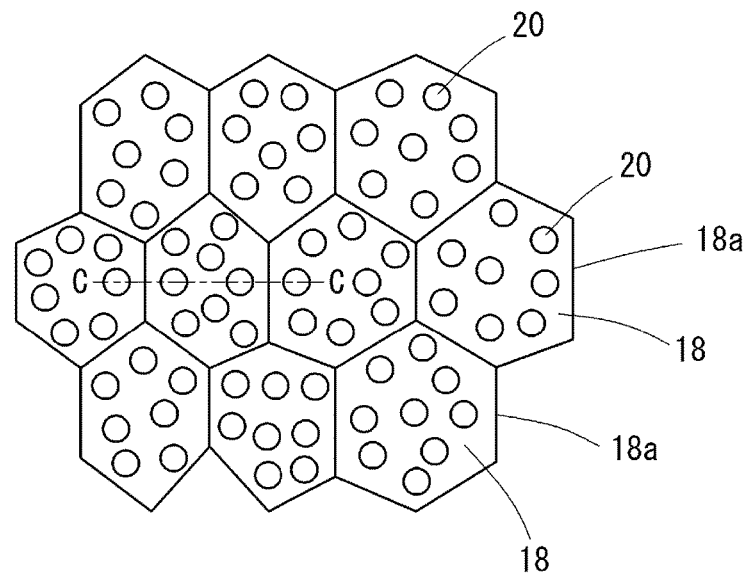
FIG. 3(a) shows a surface enlarged view and FIG. 3(b) is a cross-sectional view taken along the line C-C of FIG. 3(a), which are a modified example schematically showing the surface structure of the surface layer of the charging roll for electrophotographic equipment according to the disclosure.
Figure 3B:
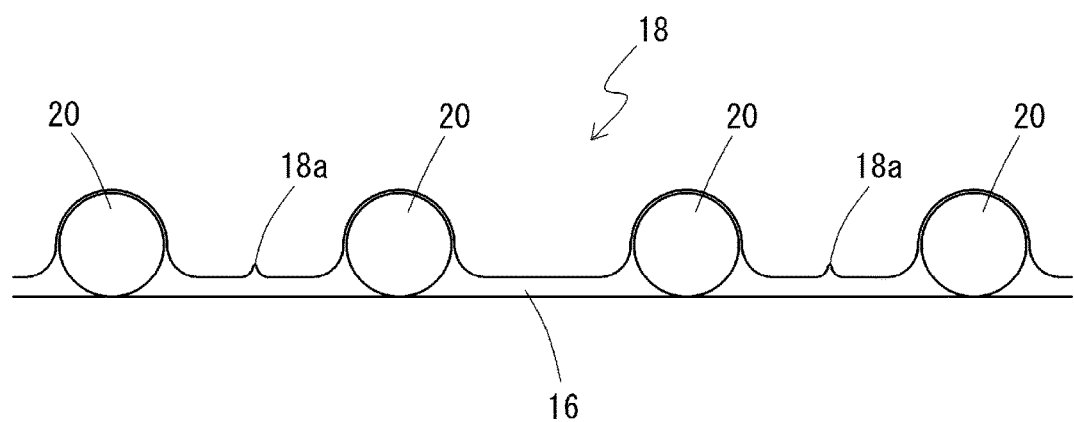
Figure 4A:
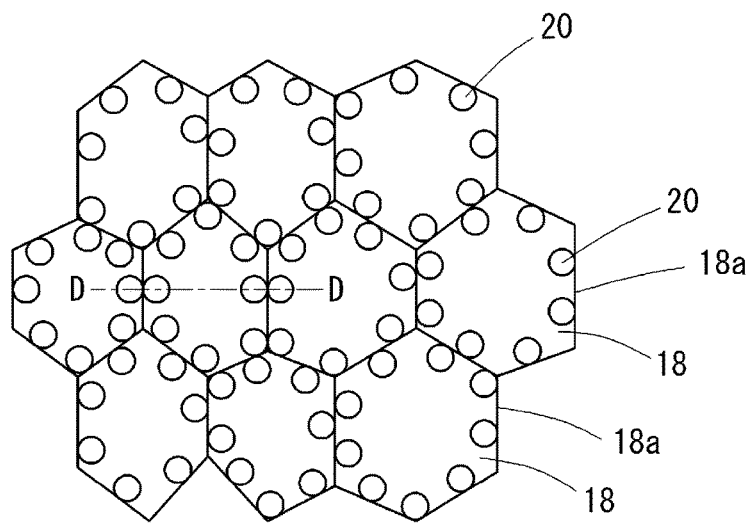
FIG. 4(a) shows a surface enlarged view and FIG. 4(b) is a cross-sectional view taken along the line D-D of FIG. 4(a), which are an example schematically showing the surface structure of the surface layer of the charging roll for electrophotographic equipment.
Figure 4B:
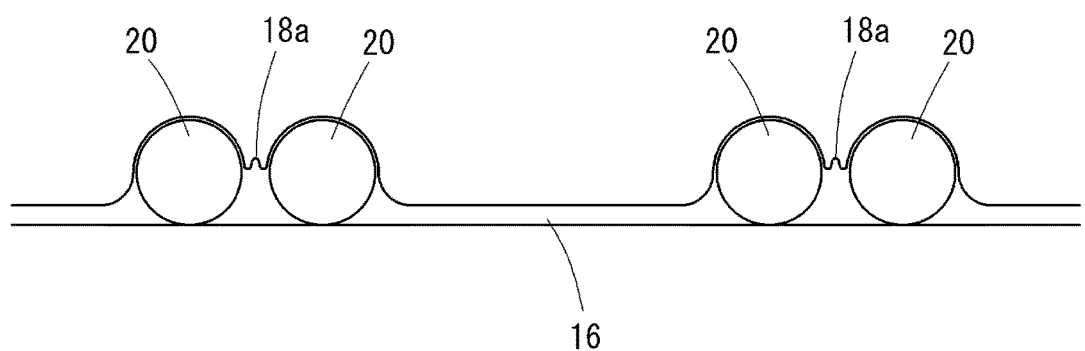

FIGS. 3(a) and 3(b) show a modification example of the disclosure in which the surface layer 16 contains roughness-forming particles 20. FIG. 3(a) is an enlarged view of the surface of the surface layer 16, and FIG. 3(b) is a cross-sectional view taken along line C-C of FIG. 3(a). In addition, FIGS. 4(a) and 4(b) show an example of a charging roll in which the surface layer 16 contains the roughness-forming particles 20. FIG. 4(a) is an enlarged view of the surface of the surface layer 16, and FIG. 4(b) is a cross-sectional view taken along line D-D of FIG. 4(a).

As described above, in the charging roll 10 according to the disclosure, the surface layer 16 contains polyamide and the modifier having a hydroxyl group, and has the Bénard cells with a height of 0.1 to 1.0 μm on the surface thereof. Since the height of the Bénard cells 18 is 1.0 μm or less, the roughness-forming particles 20 are prevented from being unevenly distributed at boundary portions of the cells (in the vicinity of the cell wall 18a) during the process of generating the Bénard cells 18. Accordingly, as shown in FIGS. 3(a) and 3(b), the roughness-forming particles 20 are uniformly dispersed in the surface layer 16 irrespective of the location of the cell wall 18a of the Bénard cells 18. By uniformly distributing the roughness-forming particles 20 in the surface layer 16, the uniformity of the surface roughness and resistance can be secured. Accordingly, the image quality becomes excellent. In addition, from this viewpoint, the height is more preferably 0.8 μm or less, and even more preferably 0.7 μm or less.

On the other hand, when the height of the Bénard cells 18 exceeds 1.0 μm, as shown in FIGS. 4(a) and 4(b), the roughness-forming particles are unevenly distributed at boundary portions of the cells (in the vicinity of the cell wall 18a) during the process of generating the Bénard cells 18, and therefore the uniformity of the surface roughness and resistance are lowered. Accordingly, the uniformity of electrostatic charge is lowered, thereby lowering the image quality.

Resin particles and the like are used for the roughness-forming particles 20. A material of the roughness-forming particles 20 is not particularly limited, and acrylic particles, silicone particles, urethane particles, or the like may be used. A size of the roughness-forming particles 20 is not particularly limited, but from the viewpoint of easily ensuring uniformity of electrostatic charge, and the like, an average particle diameter of 3.0 to 30 μm is preferable. The average particle diameter is more preferably 5.0 to 15 μm. The average particle diameter of the roughness-forming particles 20 is measured by observing the surface of the surface layer 16 with a laser microscope. The diameter of the roughness-forming particles 20 seen at the time of the above-mentioned surface observation is taken as the particle diameter and represented by an average of an arbitrary 20 roughness-forming particles 20. In addition, a content of the roughness-forming particles 20 is not particularly limited, but from the viewpoint of easily ensuring uniformity of electrostatic charge, and the like, the content is preferably within a range of 10 to 50 parts by mass with respect to 100 parts by mass of the base polymer of the surface layer 16. The content is more preferably within a range of 15 to 40 parts by mass.

The surface layer 16 may contain one or two or more kinds of various additives added to the surface layer 16 in addition to polyamide and the modifier having a hydroxyl group within a range not affecting the disclosure. Examples of such additives include conducting agents, fillers, stabilizers, ultraviolet absorbents, lubricants, mold releasing agents, dyes, pigments, flame retardants, and the like.

Examples of the conducting agents include ion conducting agents and electron conducting agents. Examples of ion conducting agents include quaternary ammonium salts, quaternary phosphonium salts, borates, surfactants, and the like. Examples of electron conducting agents include conductive oxides such as carbon black, graphite, c-TiO$_2$, c-ZnO, and c-SnO$_2$ (c- meaning conductivity), and the like.

A predetermined volume resistivity of the surface layer 16 can be adjusted depending on the type of material, combination of conducting agents, and the like. The volume resistivity of the surface layer 16 may be appropriately set within a range of $10^5$ to $10^{11}$ Ω·cm, $10^8$ to $10^{10}$ Ω·cm, and the like depending on the application and the like. A thickness of the surface layer 16 is not particularly limited, and may be appropriately set within a range of 10 to 30 μm depending on the application and the like. The thickness of the surface layer 16 is a thickness at a part where the roughness-forming particles are not present.

The surface layer 16 can be formed by coating the outer peripheral surface of the elastic body layer 14 with a surface-layer-forming composition and drying the composition. The surface-layer-forming composition contains the polyamide and the modifier having a hydroxyl group. In addition, the surface-layer-forming composition contains the roughness-forming particles 20 as necessary. Furthermore, the surface-layer-forming composition contains one or two or more kinds of various additives added to the surface layer as necessary. Furthermore, the surface-layer-forming composition contains a solvent as necessary.

The height and size of the Bénard cells 18 on the surface of the surface layer 16 can be adjusted by adjusting a component composition, solvent composition, viscosity, concentration, coating amount, film thickness, drying conditions (temperature, time, and the like), and the like of the surface-layer-forming composition. From the viewpoint of forming the Bénard cells 18 having a specific height and the like, and from the viewpoint of forming the Bénard cells 18 having a predetermined size, it is preferable to include, in a component composition, the polyamide and the modifier having a hydroxyl group as solutes. In addition, as the solvent composition, a mixed solvent of toluene and methanol is preferably contained as a solvent. A mass ratio of toluene/methanol is, for example, preferably 3/1 to 1/3. A concentration of solid contents is preferably 5 to 30% by mass. A film thickness is preferably 2 to 25 μm. In addition, as drying conditions, it is preferable to dry at a temperature of 100 to 150° C. for 30 to 60 minutes.

The elastic body layer 14 contains a crosslinked rubber. The elastic body layer 14 is formed of a conductive rubber composition containing a non-crosslinked rubber. The crosslinked rubber is obtained by crosslinking non-crosslinked rubbers. The non-crosslinked rubber may be a polar rubber or a non-polar rubber. From the viewpoint of excellent conductivity and the like, the non-crosslinked rubber is more preferably a polar rubber.

The polar rubber is a rubber having a polar group, and examples of the polar group include a chloro group, a nitrile group, a carboxyl group, an epoxy group, and the like. Specific examples of the polar rubber include hydrin rubber, nitrile rubber (NBR), urethane rubber (U), acrylic rubber (copolymer of acrylic acid ester and 2-chloroethyl vinyl ether: ACM), chloroprene rubber (CR), epoxidized natural rubber (ENR), and the like. Among these polar rubbers, hydrin rubber and nitrile rubber (NBR) are more preferable from the viewpoints that the volume resistivity thereof is particularly likely to be low.

Examples of the hydrin rubber include epichlorohydrin homopolymer (CO), epichlorohydrin-ethylene oxide binary copolymer (ECO), epichlorohydrin-allyl glycidyl ether binary copolymer (GCO), epichlorohydrin-ethylene oxide-allyl glycidyl ether terpolymer (GECO), and the like.

Examples of the urethane rubber include polyether urethane rubbers having an ether bond in the molecule. The polyether urethane rubber can be manufactured by reacting a polyether having a hydroxyl group at both terminals with a diisocyanate. The polyether is not particularly limited, and examples thereof include polyethylene glycol, polypropylene glycol, and the like. The diisocyanate is not particularly limited, and examples thereof include tolylene diisocyanate, diphenylmethane diisocyanate, and the like.

Examples of the non-polar rubber include isoprene rubber (IR), natural rubber (NR), styrene-butadiene rubber (SBR), butadiene rubber (BR), and the like.

Examples of a crosslinking agent include sulfur crosslinking agents, peroxide crosslinking agents, and dechlorination crosslinking agents. These crosslinking agents may be used alone or in combination of two or more kinds thereof.

Examples of the sulfur crosslinking agents include known sulfur crosslinking agents of the related art such as powdered sulfur, precipitated sulfur, colloidal sulfur, surface-treated sulfur, insoluble sulfur, sulfur chloride, thiuram-based vulcanization accelerators, polysulfide polymers, and the like.

Examples of the peroxide crosslinking agents include known peroxide crosslinking agents of the related art such as peroxyketals, dialkyl peroxides, peroxyesters, ketone peroxides, peroxydicarbonates, diacyl peroxides, hydroperoxides, and the like.

Examples of the dechlorination crosslinking agents include dithiocarbonate compounds. More specific examples thereof include quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, and the like.

A combination amount of the crosslinking agent is preferably within a range of 0.1 to 2 parts by mass, more preferably within a range of 0.3 to 1.8 parts by mass, and even more preferably within a range of 0.5 to 1.5 parts by mass with respect to 100 parts by mass of the non-crosslinked rubber, from the viewpoint that bleeding is unlikely to occur, and the like.

When the dechlorination crosslinking agent is used as a crosslinking agent, a dechlorination crosslinking accelerator may be used in combination. Examples of the dechlorination crosslinking accelerator include 1,8-diazabicyclo(5,4,0)undecene-7 (hereinafter abbreviated as DBU) or a weak acid salt thereof. The dechlorination crosslinking accelerator may be used in the form of DBU, but is preferably used in the form of the weak acid salt thereof from the viewpoint of handling thereof. Examples of the weak acid salt of DBU include carbonate, stearate, 2-ethylhexylate, benzoate, salicylate, 3-hydroxy-2-naphthoate, phenol resin salt, 2-mercaptobenzothiazole salt, 2-mercaptobenzimidazole salt, and the like.

A content of the dechlorination crosslinking accelerator is preferably within a range of 0.1 to 2 parts by mass with respect to 100 parts by mass of the non-crosslinked rubber from the viewpoint that bleeding is unlikely to occur, and the like. The content is more preferably within a range of 0.3 to 1.8 parts by mass, and even more preferably within a range of 0.5 to 1.5 parts by mass.

For the purpose of imparting conductivity, known conducting agents of the related art such as carbon black, graphite, c-$TiO_2$, c-ZnO, c-$SnO_2$ (c- meaning conductivity), and an ion conducting agent (quaternary ammonium salts, borates, surfactants, and the like) can be appropriately added to the elastic body layer 14. In addition, various additives may be appropriately added as necessary. Examples of the additives include a lubricant, a vulcanization accelerator, an antioxidant, a light stabilizer, a viscosity modifier, a processing aid, a flame retardant, a plasticizer, a foaming agent, a filler, a dispersant, an anti-foaming agent, a pigment, a mold releasing agent, and the like.

A predetermined volume resistivity of the elastic body layer 14 can be adjusted depending on the type of crosslinked rubber, a combination amount of the ion conducting agent, combination of the electron conducting agent, and the like. The volume resistivity of the elastic body layer 14 may be appropriately set within a range of $10^2$ to $10^{10}$ Ω·cm, $10^3$ to $10^9$ Ω·cm, $10^4$ to $10^8$ Ω·cm, and the like depending on the application and the like.

A thickness of the elastic body layer 14 is not particularly limited, and may be appropriately set within a range of 0.1 to 10 mm depending on the application and the like. The elastic body layer 14 may be a foam body or a non-foam body.

The elastic body layer 14 can be manufactured as follows, for example. First, the elastic body layer 14 is formed on the outer periphery of the shaft body 12 by coaxially installing the shaft body 12 in a hollow portion of a roll mold, and injecting a non-crosslinked conductive rubber composition thereinto, followed by heating, curing (crosslinking), and then demolding; or by extrusion molding of a non-crosslinked conductive rubber composition on the surface of the shaft body 12.

The shaft body 12 is not particularly limited as long as the shaft body has conductivity. Specific examples thereof include a solid body formed of metal such as iron, stainless steel, and aluminum; a core bar made of a hollow body; and the like. The surface of the shaft body 12 may be coated with an adhesive, a primer, or the like as necessary. That is, the elastic body layer 14 may adhere to the shaft body 12 via an adhesive layer (primer layer). The adhesives, primer, and the like may undergo electrical conduction as necessary.

According to the charging roll 10 having the above-described configuration, since the surface layer 16 contains polyamide and the modifier having a hydroxyl group and has the Bénard cells 18 with a height of 0.1 to 1.0 μm on the surface thereof, the contaminants adhere to the cell wall 18a of the Bénard cells 18, and therefore local concentration of the contaminants can be suppressed. In addition, the influence on the surface roughness can be suppressed. Accordingly, the image quality becomes excellent. In addition, when the surface layer 16 contains the roughness-forming particles 20, since the height of the Bénard cells 18 is 1.0 μm or less, the roughness-forming particles 20 are prevented from being unevenly distributed at boundary portions of the cells (in the vicinity of the cell wall 18a) during the process of generating the Bénard cells 18. Accordingly, the roughness-forming particles 20 are uniformly dispersed in the surface layer 16 irrespective of the location of the cell wall 18a of the Bénard cells 18. By uniformly distributing the roughness-forming particles 20 in the surface layer 16, the uniformity of the surface roughness and resistance can be secured. Accordingly, the image quality becomes excellent.

The configuration of the charging roll according to the disclosure is not limited to the configuration shown in FIGS. 1(a) and 1(b). For example, a configuration in which another elastic body layer is provided between the shaft body 12 and the elastic body layer 14 in the charging roll 10 shown in FIGS. 1(a) and 1(b) may be adopted. In this case, the other elastic body layer is a base layer of the charging roll, and the elastic body layer 14 functions as a resistance-adjusting layer for adjusting the resistance of the charging roll, or the like. The other elastic body layer can be made of, for example, any of the materials exemplified as the material constituting the elastic body layer 14. Furthermore, for example, a configuration in which another elastic body layer is provided between the elastic body layer 14 and the surface layer 16 in the charging roll 10 shown in FIGS. 1(a) and 1(b) may be adopted. In this case, the elastic body layer 14 is a base layer of the charging roll, and the other elastic body layer functions as a resistance-adjusting layer for adjusting the resistance of the charging roll, or the like.

EXAMPLES

Hereinafter, the disclosure will be described in detail using examples and comparative examples.

Examples 1 to 11

<Preparation of Conductive Rubber Composition>

5 parts by mass of a vulcanization auxiliary (zinc oxide, "zinc (II) oxide" manufactured by MITSUI MINING & SMELTING CO., LTD.), 10 parts by mass of carbon ("KETJENBLACK EC300J" manufactured by Ketjen Black International), 0.5 parts by mass of a vulcanization accelerator (2-mercaptobenzothiazole, "NOCCELER M-P" manufactured by OUCHI SHINKO CHEMICAL INDUSTRIAL CO., LTD.), 2 parts by mass of sulfur ("SULFAX PTC" manufactured by Tsurumi Chemical Industry Co., ltd.), and 50 parts by mass of a filler (calcium carbonate, "HAKUENKA CC" manufactured by Shiraishi Kogyo Kaisha, Ltd.) were added to 100 parts by mass of hydrin rubber (ECO, "EPICHLOMER CG102" manufactured by Daiso Chemical (Thailand) Co., Ltd.). This mixture was stirred with a stirrer and mixed, and therefore a conductive rubber composition was prepared.

<Production of Elastic Body Layer>

A core bar (shaft body, diameter of 6 mm) was set in a mold (pipe shape), the above-mentioned conductive rubber composition was poured thereinto, heated at 180° C. for 30 minutes, and then cooled and demolded. Therefore, an elastic body layer having a thickness of 1.9 mm was formed on the outer periphery of the core bar.

<Preparation of Surface-Layer-Forming Composition>

A binder polymer, a modifier, and roughness-forming particles were combined according to combination amounts (parts by mass) described in Table 1, and a concentration was adjusted with a mixed solvent of toluene and methanol (mass ratio of 1:2) so that a concentration of solid contents became 20% by mass. The concentration of solid contents is a total concentration of components other than the solvent.

<Production of Surface Layer>

The surface of the elastic body layer was roll-coated with the surface-layer-forming composition and heated at 130° C. for 50 minutes to form a surface layer having a thickness of 10 μm on the outer periphery of the elastic body layer. Therefore, charging rolls according to Examples 1 to 11 were produced. The thickness of the surface layer is a thickness at a part where the roughness-forming particles are not present.

Example 12

A charging roll according to Example 12 was produced in the same manner as in Examples 1 to 11 except that the roughness-forming particles were not combined as described in Table 1 in the preparation of the surface-layer-forming composition.

Examples 13 and 14

Charging rolls according to Examples 13 and 14 were produced in the same manner as in Examples 1 to 11 except that the concentration of solid contents was changed as described in Table 1 in the preparation of the surface-layer-forming composition.

Example 15

A charging roll according to Example 15 was produced in the same manner as in Examples 1 to 11 except that an electron conducting agent was combined as described in Table 1 in the preparation of the surface-layer-forming composition.

Comparative Example 1

A charging roll according to Comparative Example 1 was produced in the same manner as in Examples 1 to 11 except that a modifier having no hydroxyl group and having a carboxylic acid group was used in place of the modifier having a hydroxyl group in the preparation of the surface-layer-forming composition.

Comparative Example 2

A charging roll according to Comparative Example 2 was produced in the same manner as in Examples 1 to 11 except that a non-denaturing modifier was used in place of the modifier having a hydroxyl group in the preparation of the surface-layer-forming composition.

Comparative Example 3

A charging roll according to Comparative Example 3 was produced in the same manner as in Examples 1 to 11 except that the modifier was not combined in the preparation of the surface-layer-forming composition.

Comparative Example 4

A charging roll according to Comparative Example 4 was produced in the same manner as in Comparative Example 3 except that the binder polymer was changed in the preparation of the surface-layer-forming composition.

(Material of Surface-Layer-Forming Composition)

Binder 1 (binder polymer): N-methoxymethylated nylon ("EF30T" manufactured by Nagase ChemteX Corporation)

Binder 2 (binder polymer): fluorine resin ("NEOFLON PFA" manufactured by Daikin Industries, Ltd.)

Modifier 1: fluorine-based modifier having a hydroxyl group ("MEGAFACE F-477" manufactured by DIC Corporation)

Modifier 2: acrylic modifier having a hydroxyl group ("SD-10" manufactured by Toagosei Co., Ltd.)

Modifier 3: silicone-based modifier having a hydroxyl group ("XF42-B0970" manufactured by Momentive Performance Materials Inc.)

Modifier 4: silicone-based modifier having a carboxylic acid group ("X-22-3701E" manufactured by Shin-Etsu Silicones Co., Ltd.)

Modifier 5: non-denaturing silicone-based modifier ("KF-96L-lcs" manufactured by Shin-Etsu Silicones Co., Ltd., dimethyl silicone oil)

Electron conducting agent: carbon black, "DIABLACK #3030" manufactured by Mitsubishi Chemical Corporation The surface of the surface layer of each of the produced charging rolls was observed to check the generation of the Bénard cells and a dispersion state of the roughness-forming particles. In addition, the height and size of the Bénard cells, and the particle diameter of the roughness-forming particles were measured. Furthermore, image evaluation was carried out. The evaluation results and the combined composition (parts by mass) of the surface-layer-forming composition are shown in the following table.

(Surface Observation)

The surface of the surface layer of the charging roll was observed with a commercially available laser microscope (color 3D laser microscope "VK-8710" manufactured by Keyence Corporation). A measurement magnification was 400 times, a measurement pitch was 0.1 µm, and a level of laser light was 1,000.

(Height of Bénard Cells)

At the time of the above-mentioned surface observation, a height from the location at a maximum depth in the Bénard cells to an apex of a cell wall was measured and represented by an average of an arbitrary 20 Bénard cells.

(Size of Bénard Cell)

At the time of the above-mentioned surface observation, a longest distance from the apex of the cell wall to a diagonal point thereof was measured and represented by an average of an arbitrary 20 Bénard cells.

(Size of Roughness-Forming Particles)

The diameter of the roughness-forming particles seen at the time of the above-mentioned surface observation was taken as the particle diameter and represented by an average of an arbitrary 20 roughness-forming particles.

(Image Evaluation) Each charging roll was incorporated in a commercially available full-color MFP, and images with halftone printing patterns were printed under an environment of 25° C.×50% RH. Evaluation was performed at an initial stage and after enduring 10,000 images, respectively. Images that do not have horizontal streaks were evaluated as good "O," and images that have horizontal streaks at least at one place were evaluated as poor "x." In addition, each charging roll was incorporated in a commercially available full-color MFP and left to stand under an environment of 25° C.×50% RH, and then images were evaluated. As a result of evaluating images at the part corresponding to a contact part with a photosensitive drum, images that do not have horizontal streaks were evaluated as good "O," and images that have horizontal streaks were evaluated as poor "x" in photoreceptor pitch.

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Binder 1 | Polyamide | 100 | 100 | 100 | 100 | 100 | 100 | 100 | 100 | 100 | 100 | 100 | 100 |
| Binder 2 | Fluorine | — | — | — | — | — | — | — | — | — | — | — | — |
| Modifier 1 | Fluorine-based modifier (containing OH group) | 0.1 | 0.5 | 1.0 | — | — | — | — | — | — | 0.5 | 0.5 | 0.5 |
| Modifier 2 | Acrylic modifier (containing OH group) | — | — | — | 0.1 | 0.5 | 1.0 | — | — | — | — | — | — |
| Modifier 3 | Silicone-based modifier (containing OH group) | — | — | — | — | — | — | 0.1 | 0.5 | 1.0 | — | — | — |
| Modifier 4 | Silicone-based modifier (containing COOH group) | — | — | — | — | — | — | — | — | — | — | — | — |
| Modifier 5 | Silicone-based modifier (non-denaturing) | — | — | — | — | — | — | — | — | — | — | — | — |
| Roughness-forming particles 1 (10 µm) | | 30 | 30 | 30 | 30 | 30 | 30 | 30 | 30 | 30 | — | — | — |
| Roughness-forming particles 2 (1.0 µm) | | — | — | — | — | — | — | — | — | — | 30 | — | — |
| Roughness-forming particles 3 (40 µm) | | — | — | — | — | — | — | — | — | — | — | 30 | — |
| Electron conducting agent (carbon) | | — | — | — | — | — | — | — | — | — | — | — | — |
| Solvent composition | | <1> | <1> | <1> | <1> | <1> | <1> | <1> | <1> | <1> | <1> | <1> | <1> |
| Concentration of solid contents (% by mass) | | 20 | 20 | 20 | 20 | 20 | 20 | 20 | 20 | 20 | 20 | 20 | 20 |
| Thickness of surface layer (µm) | | 10 | 10 | 10 | 10 | 10 | 10 | 10 | 10 | 10 | 10 | 10 | 10 |
| Heating temperature (° C.) | | 130 | 130 | 130 | 130 | 130 | 130 | 130 | 130 | 130 | 130 | 130 | 130 |
| Heating time (min.) | | 50 | 50 | 50 | 50 | 50 | 50 | 50 | 50 | 50 | 50 | 50 | 50 |
| Height of Bénard cells (µm) | | 0.1 | 0.5 | 1.0 | 0.1 | 0.5 | 1.0 | 0.1 | 0.5 | 1.0 | 0.5 | 0.5 | 0.5 |
| Size of Bénard cells (µm) | | 500 | 500 | 500 | 500 | 500 | 500 | 500 | 500 | 500 | 500 | 500 | 500 |
| Image Evaluation | Initial stage | O | O | O | O | O | O | O | O | O | O | O | O |
| | After endurance | O | O | O | O | O | O | O | O | O | O | O | O |
| | After being left to stand in contact state | O | O | O | O | O | O | O | O | O | O | O | O |

TABLE 1-continued

|  |  | Examples | | | Comparative examples | | | |
| --- | --- | --- | --- | --- | --- | --- | --- | --- |
|  |  | 13 | 14 | 15 | 1 | 2 | 3 | 4 |
| Binder 1 | Polyamide | 100 | 100 | 100 | 100 | 100 | 100 | — |
| Binder 2 | Fluorine | — | — | — | — | — | — | 100 |
| Modifier 1 | Fluorine-based modifier (containing OH group) | 0.5 | 0.5 | 0.5 | — | — | — | — |
| Modifier 2 | Acrylic modifier (containing OH group) | — | — | — | — | — | — | — |
| Modifier 3 | Silicone-based modifier (containing OH group) | — | — | — | — | — | — | — |
| Modifier 4 | Silicone-based modifier (containing COOH group) | — | — | — | 0.5 | — | — | — |
| Modifier 5 | Silicone-based modifier (non-denaturing) | — | — | — | — | 0.5 | — | — |
| Roughness-forming particles 1 (10 μm) | | 30 | 30 | 30 | 30 | 30 | 30 | 30 |
| Roughness-forming particles 2 (1.0 μm) | | — | — | — | — | — | — | — |
| Roughness-forming particles 3 (40 μm) | | — | — | — | — | — | — | — |
| Electron conducting agent (carbon) | | — | — | 30 | — | — | — | — |
| Solvent composition | | <1> | <1> | <1> | <1> | <1> | <1> | <1> |
| Concentration of solid contents (% by mass) | | 30 | 15 | 20 | 20 | 20 | 20 | 20 |
| Thickness of surface layer (μm) | | 10 | 10 | 10 | 10 | 10 | 10 | 10 |
| Heating temperature (° C.) | | 130 | 130 | 130 | 130 | 130 | 130 | 130 |
| Heating time (min.) | | 50 | 50 | 50 | 50 | 50 | 50 | 50 |
| Height of Bénard cells (μm) | | 0.5 | 0.5 | 0.5 | 0 | 0 | 4.0 | 0 |
| Size of Bénard cells (μm) | | 200 | 1200 | 500 | 0 | 0 | 1500 | 0 |
| Image Evaluation | Initial stage | ◯ | ◯ | ◯ | ◯ | ◯ | X | ◯ |
|  | After endurance | ◯ | ◯ | ◯ | X | X | X | X |
|  | After being left to stand in contact state | ◯ | ◯ | ◯ | X | X | — | ◯ |

Based on the examples and the comparative examples, when the modifier was not contained in the coating film containing polyamide (Comparative Example 3), the height of the Bénard cells was high and the roughness-forming particles were unevenly distributed in the vicinity of the cell wall (refer to FIGS. 4(a) and 4(b)). For this reason, the uniformity of the surface roughness and resistance was lowered, and thus the streak images were generated from the initial stage due to a decrease in the uniformity of electrostatic charge. Accordingly, a test after the roll was left to stand in a contact state was not carried out. In addition, when only the non-denaturing modifier was contained in the coating film containing polyamide (Comparative Example 2), the Bénard cells were not generated, and contaminants such as residual toner and external additives gathered around a local area such as bottom roughness-forming particles, and thus the streak images were generated after endurance. Furthermore, when only the modifier having a functional group other than a hydroxyl group, such as a carboxylic acid group was contained in the coating film containing polyamide (Comparative Example 1), the Bénard cells were not generated, and contaminants such as residual toner and external additives gathered around a local area such as bottom roughness-forming particles, and thus the streak images were generated after endurance. On the contrary, when the modifier having a hydroxyl group was contained in the coating film containing polyamide (example), the Bénard cells having a predetermined height were formed on the surface of the surface layer, and due to the Bénard cells, the contaminants such as residual toner and external additives were not locally concentrated. In addition, the roughness-forming particles were not unevenly distributed in the vicinity of the cell wall, but were uniformly dispersed on the surface of the surface layer (refer to FIGS. 3(a) and 3(b)). As a result, generation of the streak images was suppressed at the initial stage and after the endurance. In addition, even after the roll was left to stand in a contact state, generation of the streak images was suppressed. The reason for this is presumed to be that a hydroxyl group of the modifier which appears on the surface intermolecularly interacts with the polyamide of the binder polymer via a hydrogen bond, and therefore the transition to the photosensitive drum is suppressed. Such an effect cannot be obtained with a modifier having other functional group or a non-denaturing modifier. For example, in Comparative Examples 1 and 2, it is recognized that horizontal streaks were generated, and the modifier transferred to the photosensitive drum even after the roll was left to stand in a contact state. Furthermore, in Comparative Example 4, in the case of the binder polymer other than the polyamide, the generation of the Bénard cells was suppressed even without adding the modifier. However, since the Bénard cells were not generated, generation of the streak images after endurance was not suppressed.

According to the charging roll for electrophotographic equipment of the disclosure, the surface layer contains the polyamide and the modifier having a hydroxyl group, the modifier having a hydroxyl group is at least one kind of the fluorine-based modifier, the silicone-based modifier, or the acrylic modifier, and the surface layer has Bénard cells with a height of 0.1 to 1.0 μm on the surface thereof, and therefore excellent image quality can be obtained.

Hereinbefore, the embodiments and examples of the disclosure have been described; however, the disclosure is not limited to the above-described embodiments and examples, and various modifications can be made within a range not departing from the gist of the disclosure.

What is claimed is:

1. A charging roll for electrophotographic equipment, comprising:
    an elastic body layer; and
    a surface layer formed on an outer periphery of the elastic body layer,
    wherein the surface layer contains polyamide and a modifier having a hydroxyl group, the modifier having a hydroxyl group is a fluorine-based modifier, and the surface layer has Bénard cells with a height of 0.1 to 1.0 µm on a surface thereof, the surface layer contains roughness-forming particles having an average particle diameter within a range of 3.0 to 30 µm, and a size of the Bénard cells is within a range of 250 to 1100 µm.

* * * * *